United States Patent [19]

Schoute et al.

[11] Patent Number: 4,497,978
[45] Date of Patent: Feb. 5, 1985

[54] METHOD AND APPARATUS FOR PREVENTING OVERLOADING OF THE CENTRAL CONTROLLER OF A TELECOMMUNICATION SYSTEM

[75] Inventors: Frederik C. Schoute; Adrianus W. Doorduin; Jacobus L. M. Hooijmans, all of Hilversum, Netherlands

[73] Assignee: U.S. Philips Corporation, New York, N.Y.

[21] Appl. No.: 504,102

[22] Filed: Jun. 15, 1983

[30] Foreign Application Priority Data

Jun. 15, 1982 [NL] Netherlands ........................ 8202419

[51] Int. Cl.³ ........................................... H04M 15/10
[52] U.S. Cl. .................................. 179/9; 179/18 EA; 179/18 EB
[58] Field of Search .................... 179/9, 7.1 R, 18 AB, 179/18 EB, 8 A, 8 R, 7 R, 18 EE, 18 EA, 18 ES; 178/3; 364/514

[56] References Cited

U.S. PATENT DOCUMENTS 3,796,837  3/1974  Mathews ........................ 179/18 EA Primary Examiner—Stafford D. Schreyer
Attorney, Agent, or Firm—Thomas A. Briody; William J. Streeter

[57] ABSTRACT

In telecommunication systems in which tasks are performed collectively and centralized by the processor of the central controller, the problem is encountered that this central control may be overloaded. The method in accordance with the invention has for its object to prevent this by rapidly detecting an imminent overload. The number of tasks (for example calls) being processed and the number of idle jobs which were performed are taken as a measure of the load. On the basis of the continuously actualized value of the maximum number of tasks which can be handled it is determined at each new task (for example a call from a subscriber) whether the maximum calls in the process of being set-up determined for that period is not exceeded.

9 Claims, 4 Drawing Figures

METHOD AND APPARATUS FOR PREVENTING OVERLOADING OF THE CENTRAL CONTROLLER OF A TELECOMMUNICATION SYSTEM

BACKGROUND OF THE INVENTION

The invention relates to a method of preventing overloading of the central controller of a telecommunication system, more specifically a telephone exchange of the type commonly referred to as the stored program controlled (SPC) type.

The invention further relates to an arrangement for performing the method.

In the present telecommunication systems some provisions are of a common and centralized construction, so that only limited numbers of these systems are sufficient. This imposes restrictions on the processing capacity of the system. In systems which comprise a central controller, use is made of the central processor for all connections and connection requests. Owing to the limited quantity of processor time, queues of, for example, telephony tasks are formed. In the event of growing waiting times the required response time can no longer be satisfied, while in the most serious case calls will fail. As processor time is also consumed by unsuccessful calls, the number of successfully processed calls will decrease even further.

In order to avert an imminent overloading of the central controller it is known to predict the number of calls which may be accepted in a subsequent period on the basis of the processor load in a preceding period and the number of calls accepted in that preceding period. In order to prevent excessive fluctuations caused by fluctuations in the number of calls, a limit is imposed on the increase or decrease, as the case may be, of the number of calls which may be accepted in the subsequent period. Owing to the inertia of this control the processor capacity is not optimally utilized and that more specifically at the instant at which this capacity is required to its full extent.

It is an object of the invention to provide a method of preventing overloading of the central controller by means of which in a simple, fast and reliable way an imminent overload is detected and thereafter averted, and by means of which the lowest possible number of calls are refused.

SUMMARY OF THE INVENTION

According to the invention, the method of preventing overloading of the central controller is characterized in that the method comprises the following steps:

1. the determination of the number of calls which were in the process of being set-up in a first period of a predetermined duration;
2. the determination of the total demand on the capacity of the central controller in the said first period by the number of calls in the process of being set-up determined in step 1, and the remaining tasks of the central controller;
3. the estimation of the maximum number of calls which can be in the process of being set-up at a maximum load of the central controller in a second period of a predetermined duration;
4. the determination for each newly offered call in the said second period whether thereby the instantaneous number of calls in the process of being set-up reaches the maximum number estimated in step 3;
5. accepting the offered call if and for so long as the number estimated in step 3 has not been reached;
6. rejecting the prevented call if this was the case;
7. repeating the steps 1 to 6, inclusive in a subsequent first period for calls to be offered in a next second period.

By means of this method it is accomplished that substantially no offered calls need be refused unnecessarily by the exchange.

It is advantageous if consecutive first periods partly overlap each other, the method preferably being performed such that the said first period consists of $k(k \geq 2)$ sub-periods, that in each sub-period the number of calls in the process of being set-up determined in step 1 and the total of the demand on the central controller capacity determined in step 2 and the estimation effected in step 3 are based on the k results in the k sub-periods. This accomplishes that on the one hand, during a relatively long first period, and consequently reliably, the number of calls in the set-up phase can be measured k times and on the other hand sudden increases in the traffic offered can be rapidly passed on. Thus it has been found that a first period having a duration of 4 sec. which always shifts 1 sec. and is divided into 4 sub-periods is a suitable choice for telephone exchanges of the SPC type.

In addition to sudden increases in the traffic offered which is responded to in the above-described way, sudden increases in the load of the central controller may also occur as a result of tasks which are not closely associated with a call: for example owing to the commencement of a traffic measuring program. The accompanying sudden load increase is generally much steeper than the sudden increase in the traffic offered. Therefore it is advantageous that, if the number of calls in the process of being set-up and/or the total of the demand is significantly higher in the $k^{th}$ sub-period than in the preceding $(k-1)$ sub-period or if the maximum has been reached, as the case may be, no setting-up of offered calls is started in the subsequent second period.

The load on the central controller is determined in a simple way when the determination of the total demand on the capacity of the central control to be determined in step 2 is effected by subtracting the measured capacity spent on idle jobs from the maximum capacity.

It is further advantageous if the number of calls which are in the process of being set-up to be determined in step 2 is effected by balancing, in a second period of time having a predetermined duration the calls in the process of being set-up, the calls of which the set-up is started and the calls which have been processed.

A further object of the invention is to provide an arrangement with which the method in accordance with the invention is performed in a simple way, which requires only a small load on the central controller. The arrangement for performing the method is therefore characterized in that it comprises a first storage arrangement for storing the value of the total demand on the capacity of the central controller in the first period, a second storage arrangement for storing the value of the number of calls which are in the process of being set-up in the first period, a first arithmetic unit for determining from the values recorded in the two storage arrangements the maximum number of calls which can be in the process of being set-up, a counter for counting the instantaneous number of calls in the process of being set up in a second period, a difference-producing unit for comparing the counting position with the maximum number of calls which can be in the process of being set-up, a change-over switch, an acceptance unit, a rejection unit and a call detector, that the change-over switch connects the acceptance unit to the call detector under the control of the difference-producing unit, that the acceptance unit is connected to an input of the counter for incrementing the counting position by one when a call is accepted, that an output of the counter is connected to an input of the second storage arrangement for recording in or at the end of the second period the counting position and that the arrangement further comprises means connected to an input of the first storage arrangement for determining the total of the demand on the capacity of the central controller in the said second period.

BRIEF DESCRIPTION OF THE DRAWING

The invention and its advantages will now be further described by way of example with reference to the drawing. Therein

DESCRIPTION OF THE PREFERRED EMBODIMENTS

In telecommunication systems which comprise a central controller, a processor which forms part of the central controller is used for making, maintaining and breaking connections. In automatic telephone exchanges of the stored program controlled (SPC) type signalling, path searching, metering, and observation of the traffic for error detection, that is telephony tasks in a narrow sense, are performed by the central control. In addition, the central controller also performs tasks of an administrative nature (for example making operative or blocking, as the case may be, subscriber's connections), in the field of supervision (locating errors, processing errors), and measurements (for example, traffic measurements). For economic reasons the central controller is of such a size that the average load to be expected can be easily handled. However, in the event of peak loads overload may occur so that offered calls have to be refused. In addition, in such a situation long queues of telephony tasks for the processors occur as a result of which the requirements as regards response can also no longer be satisfied. As processor time is also spent on refused calls the number of successfully handled calls decreases.

The invention provides a method of preventing overloading of the central controller. For that purpose the number of calls ($CIB_i$) which were in the process of being set-up in a first period of a predetermined duration are determined. The determination thereof may be effected by counting how many calls were in the process of being set-up in the relevant period (for example on an average) or to estimate it by taking, in that first period, a sample of the calls which are at that moment in the process of being set-up.

Thereafter the total of the demand on the capacity of the central controller is determined. This includes both the demand on the capacity for the calls being set-up and the demand on the capacity for the remaining tasks. This is measured by determining the complement, namely the number of what are commonly referred to as idle jobs performed in the relevant period.

Figure 1:
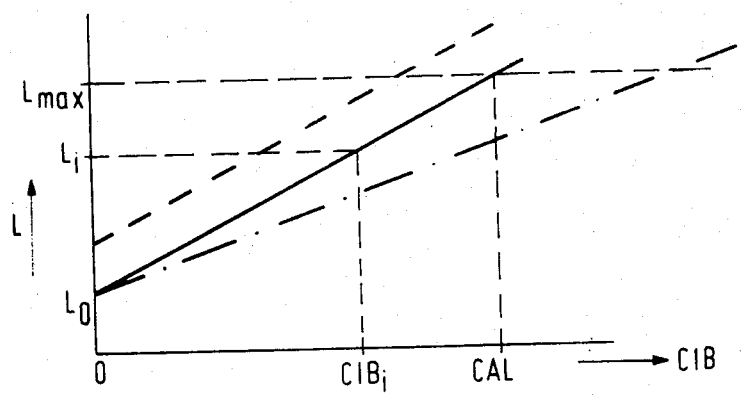
FIG. 1 shows the load on the processor of the central controller as a function of the number of calls in the process of being set-up.

If a graph of the number of calls being set-up versus the load on the central controller L is plotted, then a relationship is found as shown in FIG. 1 (solid line). If no calls are in the setting-up phase, the load is equal to $L_o$, the what is commonly referred to as the zero load. With an increasing number of calls in the process of being set-up the load increases substantially directly proportionally therewith until a maximum load $L_{max}$ is reached. The number of calls in the process of being set-up which are then processed is equal to CAL (call acceptance limit).

Maximum load is here understood to mean that load of the processor at which all telephony tasks and other tasks are just performed within the required response times. This maximum load is generally lower than maximum loading of the actual processor and amounts to, for example, 90% of that value.

The load line is not invariable but depends on a number of factors. If the zero-load becomes high, (for example due to the commencement of traffic measurements) then the load line will shift to higher load values (dashed line), which implies that the maximum number of calls which may enter the setting-up phase decreases. Likewise, the composition of the traffic offered (local, trunk calls, the what is commonly referred to as call mix) may be subjected to changes. For the load line this will have, for example, the consequence denoted by the dot-and-dash line in FIG. 1. The number of calls of which the set-up may be started becomes significantly larger in that case. It is therefore important to know how high the instantaneous load $L_i$ of the central controller is and with how many calls in the process of being set-up $CIB_i$ that load occurs. By means of a second point ($CIB_j$, $L_j$) in the graph the variation of the load line can be derived and from this it can be determined how many calls in the process of being set-up (CIB=CAL) are possible at a maximum load ($L_{max}$). By way of second point the load at, for example, zero-load conditions can be determined ($CIB_j=0$ and $L_j=L_o$). This might be done by measuring $L_o$. For the purpose of simplicity and in view of a low load for the central control, a fixed value for $L_o$ and more specifically $L_o=0$, has been opted for. The load line is assumed to pass as it were through the origin. An error is then indeed introduced in the calculated value of the call acceptance limit CAL but this error decreases versus an increasing load of the central control and is accurately zero if $L_i=L_{max}$. The error is, however, of such a nature that the call acceptance limit value which is determined is on the low side so that an overload owing to this error is impossible.

The call acceptance limit value is assumed to hold for a given future period, namely a second period of a predetermined value. Every offered call which reaches the central controller in this second period will increment the number of calls in the setting-up process by one. It is checked whether as a result thereof the call acceptance limit value is reached. If the total of the instantaneous number of calls being set up incremented by the actual call remains below said limit value then the call is allowed to enter the setting-up phase and the number of calls being processed is increased by one. If in contrast therewith the limit value is reached the call is rejected. Whether or not an offered call is accepted for setting up is made known to the subscriber by the customary, known handling procedure (for example by applying the dial tone or busy tone, as the case may be, to the subscriber set). All calls occurring in that second period are handled in this way. The possibility, after a call has been rejected, of having this call wait for a short period of time and then trying to reach acceptance once more thereafter may be considered. Namely, in that period of time the number of calls being processed may have decreased below the limit value because the setting-up of a number of calls has been completed in that period. The number of calls being set-up in the second period is the balance of the number of calls in the setting-up phase at the beginning of that second period, the number of calls which since then have entered the setting-up phase and the number of calls successfully handled.

Figure 2:
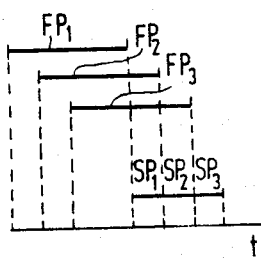
FIG. 2 shows a time diagram to illustrate the choice of the periods in the method in accordance with the invention.

At the end of the second period the entire cycle is repeated for a subsequent continuous second period, however, with calculated-limited value. The manner in which this is effected is shown in FIG. 2 for three consecutive second periods. In the second period SP1 calls are accepted or rejected on the basis of the call acceptance limit value which is based on an estimation thereof performed on results which relate to a first period FP1. Likewise, the actual limit value in the subsequent second period SP2 is derived from the results in a subsequent first period FP2. For the third second period SP3 shown the limit value determined in the first period FP3 holds. Consecutive first periods FP partly overlap. This method has the advantage that the load (in the form of calls being processed) is measured over a comparatively long first period, causing fluctuations in this quantity to be averaged. Furthermore, real sudden increases in the load are rapidly responded to because of the fact that the periods are of a short duration and consequently succeed each other rapidly.

In a practical embodiment of the method the duration of the first period is chosen to be 4 seconds and for the second period 1 second, each first period overlapping the previous first period by 3 seconds.

In some situations it may be desirable to respond very rapidly to a sudden increase of the load. Thus, a duration of four seconds being chosen for a first period, in the first second after the occurrence of a sudden increase of the load only one quarter of that sudden load increase would be included in the determination of the call acceptance limit. If this is too slow the method can be adapted so that when in a sub-period (namely the last sub-period of the first period) the load amounts to 100% all the offered calls are rejected.

Figure 3:
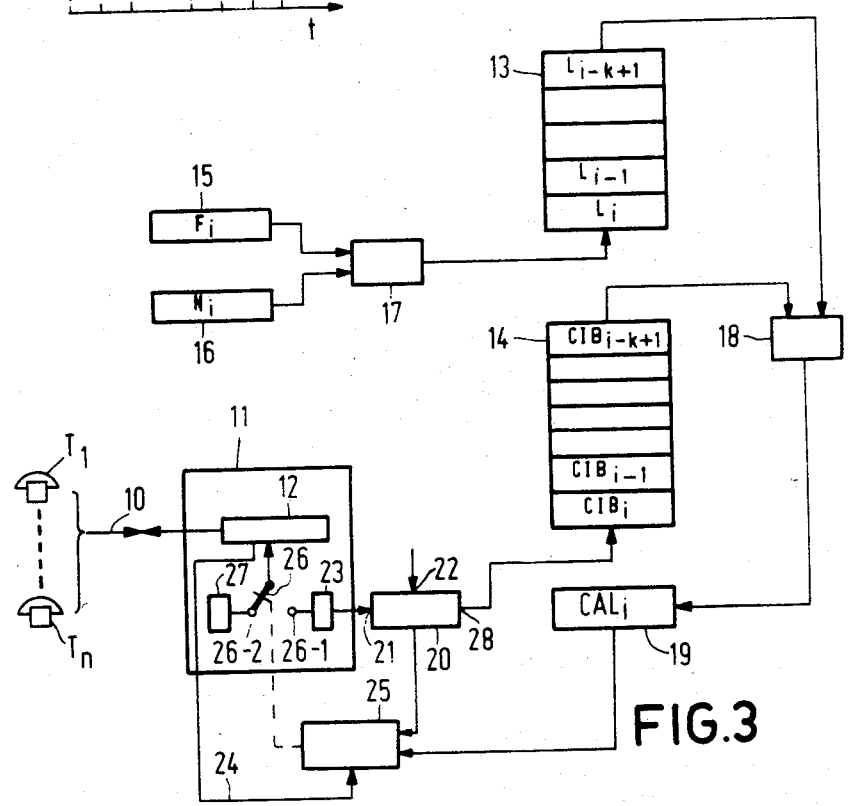
FIG. 3 shows a schematic representation of an arrangement for performing the method in accordance with the invention and FIG. 4 shows a schematic representation of an alternative for the second arithmetic unit for use in the arrangement according to FIG. 3.

An embodiment of an arrangement for performing the method of preventing overload from occurring is shown block-schematically in FIG. 3. The subscriber's sets T1, ... Tn are each connected to an input circuit 11 of the telecommunication system via a two-way connection 10. The two-way connection 10 is connected to a call detector 12 which is part of the input circuit 11 and has for its object to detect when a subscriber makes a call. The input circuit 11 must have the ability to accept or reject the offered call. For that purpose the arrangement comprises the following means. The values of the total demand on the capacity of the central controller L in the preceding k sub-periods, namely $L_i$, $L_{i-1}$, $L_{i-k+1}$ are stored in a storage arrangement 13, which comprises k storage locations. These k values form, as it were, the k samples of the capacity demand in a first period FP. A value $L_j$ which is representative of the load of the central controller, for example at the end of a sub-period j, is found by combining: the fraction $F_j$ of the period j the central controller spends on idle jobs (or the number of idle jobs processed by the central processor) and the number of tasks $N_j$ waiting at the end of the period j before the processor. The total of the demand on the capacity of the central controller $L_j$ in the sub-period j is then $$L_j = W(1-F_j) + (1-W)N_j/(N_j+1) \qquad (1)$$

in which W is a weighting factor between 0 and 1. If $W=1$ then no account is consequently taken of the number of tasks $N_j$ waiting before the processor, which situation was in the foregoing the starting point of the detailed description of the method. If $W=0$ then, in contrast therewith, no account is taken of the idle fraction $F_j$ and only the number of waiting tasks $N_j$ for the processor of the central controller determines the load. For each value of W between 0 and 1 both factors are taken into account.

In each sub-period j the value of $F_j$ and $N_j$ are applied to registers 15 and 16, respectively. Outputs of these registers are connected to a first arithmetic unit 17, which calculates the value of $L_j$ in accordance with formula (1). At the end of each sub-period j the value of L is written into storage arrangement 13 at sub-period $L_j$. This is effected in such a way that the most recently calculated value of L replaces the least recent value in the storage arrangement 13. Consequently, the storage arrangement 13 comprises always the k most recent values (samples) of the capacity demand L. FIG. 3 shows the values of $j=i, i-1, \ldots i-k+1$.

The k values of the number of calls being set-up $CIB_j$ in the last k sub-periods are present in storage arrangement 14, which also comprises k locations. The values of $CIB_j$ in the storage arrangement 14 relates to the same sub-periods as those of $L_j$ in store 15.

A second arithmetic unit 18 determines from the values stored in the storage arrangement 13 and 14 the average capacity demand $\overline{L}_i$ and the average number of calls being set up $\overline{CIB}_i$. Consequently:

$$\overline{CIB}_i = (CIB_i + CIB_{i-1} + \ldots CIB_{i-k+1})/k$$

$$\overline{L}_i = (L_i + L_{i-1} + \ldots L_{i-k+1})/k \qquad (2)$$

The call acceptance limit $CAL_i$ is determined by the second arithmetic units from the formula:

$$CAL_i = \overline{CIB}_i(L_{max}-L_o)/(L_i-L_o) \qquad (3)$$

The load line (see FIG. 1) is in the present case the line through the points $(0, L_o)$ and $(\overline{CIB}_i, \overline{L}_i)$. The result of this calculation $CAL_i$ is written into register 19.

In addition, the arrangement comprises an (up/down) counter 20 for counting the number of calls being set-up. For that purpose the counter 20 has a first input 21 to which an acceptance unit 23 is connected for incrementing the counting position of counter 20 for each call which enters into the set-up phase. The counter 20 further has a second input 22 for decrementing the counting position of counter 20 for each successfully processed call. Therefore, the counting position of counter 20 always shows the instantaneous value of the number of calls being set up.

If now a call is detected by call detector 12, a difference unit 25 is activated via connection 24. The difference unit 25 compares the counting positions of counter 20 (CIB) applied to its input with the value ($CAL_i$) stored in register 19. If $CIB < CAL_i$ then a control signal supplied by difference unit 25 (shown by means of a dotted line) adjusts a change-over switch 26 to the position 26-1. This results in the acceptance unit 23 reporting to the subscriber set $T_j$ via call detector 12 that the offered call has been accepted and that its set-up is started. At the same time the acceptance unit increments the counting position by one via input 21 of counter 20. If in contrast therewith $CIB \geq CAL_i$ then the change-over switch 26 is adjusted to the position 26-2 by a control signal supplied by difference unit 25 and the rejection unit 27 reports to the subscriber set $T_j$ via the call detector 12 that the offered call is refused.

The call acceptance limit $CAL_i$ is valid during a second period of a predetermined duration. This limit is used for all calls offered in that period. In a subsequent second period a new value of $CAL_i$ is used. The number of calls being set up is determined in, or at the end of such a second period and applied to storage arrangement 14 via input 28 and then forms the most recent sample. Acting thus the number of calls being set up in that period partly determines the acceptance limit in the future k sub-periods.

If the last value of the load $L_i$ is a sudden peak then this may be sufficient cause, to create the possibility of a rapid response to overload, not to accept new calls in the period $i+1$.

It is alternatively possible to employ more refined methods such as for example linear regression instead of using the average value of CIB and L ($\overline{CIB}_i, \overline{L}_i$) as the starting point.

In addition, as mentioned already in the foregoing it is useful for some applications to have new calls, when $CIB \geq CAL_i$, wait a short period of time, as it is possible that in that period CIB becomes less than $CAL_i$. In this way a still more exhaustive use of the processor of the central controller can be obtained.

It may also be useful to have the acceptance of a call depend on the urgency, the importance etc. of the call. Calls which enter via trunk lines may, for example, be given a higher priority than calls coming directly from subscribers as the telecommunications system has invested more in the first-mentioned calls. This can be implemented by giving $L_{max}$ in formula (3) a higher value ($L_{max}, h$) for calls having a higher priority than for calls having a lower priority ($L_{max}, l$). This implies that the second arithmetic unit 18 determines two values for $CAL_i$, namely $CAL_i(L_{max}, h)$ and $CAL_i(L_{max}, l)$. Both values are applied to a difference unit 25. In the event that the acceptance of a call having a higher priority must be judged, then this is decided on the basis of the result of the equation $$CIB < CAL_i(L_{max}, h); \tag{4a}$$

and in the event of a lower priority on the basis of the equation $$CIB < CAL_i(L_{max}, l) \tag{4b}$$

This differentiation accomplishes a more economical use of the central controller.

In a practical arrangement for performing the method k is equal to 4. It should be noted that the arrangement can be realised by means of universal sequential logic circuits such as commercially available microprocessors with associated stores and peripheral equipment. The processor of the central controller might be used to advantage for that purpose.

As explained above, also in the case of sudden changes in the load the call acceptance limit can be adapted in a reasonably fast way to that new load value. If a still faster adaptation is required this is provided in the following way.

Figure 4:
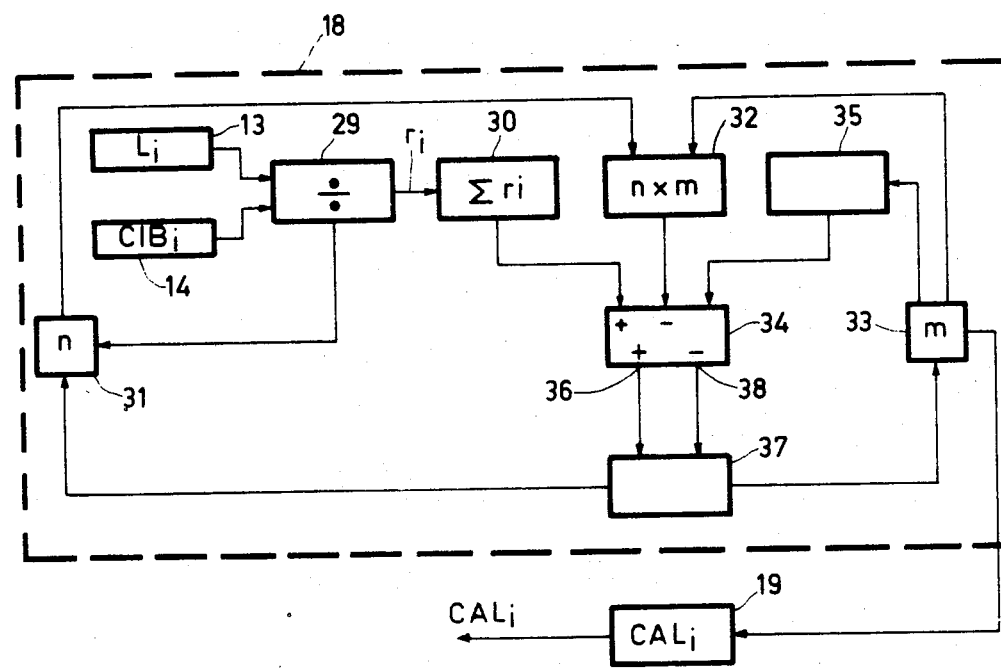

The second arithmetic unit of the arrangement shown in FIG. 3 is arranged as shown in FIG. 4. The storage device 13 which may now consist of only one memory location contains the value of the total demand on the capacity of the central controller in the last sub-period, namely $L_i$. In the storage device 14 which may now also consist of only one memory location the value is stored of the number of calls in the process of being set-up $CIB_i$ in the last sub-period. The values stored in the storage devices 13 and 14, respectively are applied to the divider arrangement 23 for the determination of the quantity $r_i = L_i/CIB_i$, i.e. the load of each call being set-up, and this value $r_i$ is added in the accumulator 30 to the previous value of $r_i$ so as to obtain the $$\text{sum } \sum_{i=1}^{n} r_i.$$

Each time the divider arrangement 29 has determined a new value of $r_i$ counter 31 is incremented one step. The instantaneous counter content forms the value of n. The anticipated value of the $$\text{sum } \sum_{i=1}^{n} r_i$$

grows as $n \cdot m$, wherein m is the present estimate of the average load per call being set-up. The anticipated value is determined by multiplier 32, which for this purpose is connected to an output of counter 31 and to an output of a storage device 33 in which the present value of m has been stored. In addition, the second arithmetic unit comprises a comparison arrangement 34 having three inputs. Accumulator 30 is connected to a first input and multiplier 32 is connected to a second input. A third input of comparison arrangement 34 is coupled to a further output of storage device 33 via a threshold value arrangement 35.

The comparison arrangement 34 determines whether $$\left| \sum_{i=1}^{n} r_i - n \cdot m \right|$$

is larger or smaller than the threshold value generated by the threshold value arrangement 35. If $$\left| \sum_{i=1}^{n} r_i - n \cdot m \right|$$

is smaller than the threshold value, no action is taken. In the other case there are two possibilities, namely $$\sum_{i=1}^{n} r_i - n \cdot m$$

is positive or negative. In a first case a control signal is applied via a first output 36 of comparison arrangement 34 to a connection unit 37 which results in the present value of the average load per call being set-up (m) being incremented by dm, whereas in the second case a control signal is applied via a second output 38 to the correction unit which results in m being decremented by dm. To that end, an output of correction unit 37 is connected to a reset input of counter 31 for resetting counter 31 each time m is adapted (by +dm or −dm). Thus, the accumulator 30 is reset to zero and the comparison arrangement thereafter determines a new $$\text{sum } \sum_{i=1}^{n} r_i.$$

The value of m, stored in a storage device 33 serves as a basis for the value of the call acceptance limit $CAL_i$ which is stored in register 19 ($CAL_i = L_i/m$) and is employed in a manner described with reference to FIG. 3 to determine whether new calls are accepted or not.

The threshold value generated by the threshold value arrangement has for its object to prevent frequent, useless adaptations of the call acceptance value and is, for example, chosen equal to $$\frac{m^2}{dm \cdot k} \cdot \ln\left(\frac{1-q}{q}\right)$$

wherein k represents the number of tasks generated on an average for the processor by one call during setting-up and q is the error probability of (due to statistic fluctuations) adapting the value of m into the incorrect direction. Representative values for k and q, respectively are 100 and 0.01, respectively.

What is claimed is:

1. A method of preventing overloading of the central controller of a telecommunication system, more specifically a telephone exchange, comprising the following steps:
   1. determining the number of calls which were in the process of being set-up in a first period of a predetermined duration;
   2. determining the total demand on the capacity of the central controller in the said first period by the number of calls in the process of being set up determined in step 1, and the remaining tasks of the central controller;
   3. estimating the maximum number of calls which can be in the process of being set-up at a maximum load of the central controller in a second period of a predetermined duration;
   4. determining for each newly offered call in the said second period whether thereby the instantaneous number of calls in the process of being set-up reaches the maximum number determined in step 3;
   5. accepting the offered call if and for so long as the number determined in step 3 has not been reached;
   6. rejecting the offered call if this was the case; and
   7. repeating the steps 1 to 6, inclusive in a subsequent first period for calls to be offered in a subsequent second period.

2. The method as claimed in claim 1, wherein consecutive first periods overlap each other.

3. The method as claimed in claim 2, wherein the said first period consists of k (k≧2) sub-periods, the number of calls in the process of being set-up determined in step 1 and the total of the demand determined in step 2 is stored and the estimation made in step 3 is based on the k results in the k sub-periods.

4. The method as claimed in claim 3, wherein if the number of calls in the process of being set-up and/or the total of the demand in the $k^{th}$ sub-period is significantly higher than in the preceding (k−1) sub-period or the maximum is reached, as the case may be, then no offered calls are allowed to enter the set-up phase in the subsequent second period.

5. The method as claimed in claim 3 wherein the first period has a duration of k.a.sec., the second period a sec. and the subsequent first periods overlap each other (k−1)a sec., more specifically (k−1) sec. and the first period comprises k sub-periods.

6. The method as claimed in claim 3 wherein the instantaneous number of calls being set up determined in step 4 is effected by balancing the calls being set up, the calls allowed to enter the set-up phase and the calls which have been processed.

7. The method as claimed in claim 3 wherein the total of the demand on the capacity of the central controller to be determined in step 2 is effected by reducing the maximum capacity by the measured capacity spent on idle jobs.

8. The method as claimed in claim 7 wherein the total load on the capacity of the central controller to be determined in step 2 is also included in the number of tasks waiting for the central control at the end of the said first period.

9. An arrangement for performing a method of preventing overloading of the central control of a telecommunication system as claimed in claim 1, comprising a first storage arrangement for storing the value of the total of the demand on the capacity of the central control in the first period, a second storage arrangement for storing the value of the number of calls in the process of being set-up in the first period, a first arithmetic unit for determining the maximum number of calls which may be in the setting-up phase from the values stored in the two storage arrangements, a counter for counting the instantaneous number of calls in the process of being set-up in a second period, a difference unit for comparing the counting position with the maximum number of calls which may be in the setting-up phase, a change-over switch, an acceptance unit and a call detector, that the change-over switch connects the acceptance unit or the rejection unit, as the case may be, to a call detector under the control of the difference unit, that the acceptance unit is connected to an input of the counter for incrementing by one the counting position on acceptance of a call, that an output of the counter is connected to an input of the second storage arrangement for recording in, or at the end of the second period the counting position and that the arrangement further comprises means which are connected to an input of the first storage arrangement for determining the value of the total of the demand on the capacity of the central controller in the said second period.

* * * * *